United States Patent
Terada et al.

(10) Patent No.: US 12,276,065 B2
(45) Date of Patent: Apr. 15, 2025

(54) TUNGSTEN-BASED INFRARED-ABSORBING PIGMENT DISPERSION, DYEING LIQUID, FIBER PRODUCT, AND METHOD FOR TREATING FIBER PRODUCT

(71) Applicant: Kyodo Printing Co., Ltd., Tokyo (JP)

(72) Inventors: Akira Terada, Tokyo (JP); Tomomi Karino, Tokyo (JP); Fumihito Kobayashi, Tokyo (JP)

(73) Assignee: KYODO PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/267,609

(22) PCT Filed: Dec. 17, 2021

(86) PCT No.: PCT/JP2021/046876
§ 371 (c)(1),
(2) Date: Jun. 15, 2023

(87) PCT Pub. No.: WO2022/138512
PCT Pub. Date: Jun. 30, 2022

(65) Prior Publication Data
US 2024/0052556 A1 Feb. 15, 2024

(30) Foreign Application Priority Data
Dec. 24, 2020 (JP) ................. 2020-215527

(51) Int. Cl.
*C09B 67/00* (2006.01)
*C09B 67/46* (2006.01)
*D06M 11/48* (2006.01)

(52) U.S. Cl.
CPC ......... *D06M 11/48* (2013.01); *C09B 67/0084* (2013.01)

(58) Field of Classification Search
CPC .............. D06M 11/48; D06M 2200/25; C09B 67/0084; C09C 1/00; C09C 3/10; C09D 17/004; C09D 17/00; D06P 1/5235; D06P 5/00
USPC ............................................................ 8/621
See application file for complete search history.

(56) References Cited

U.S. PATENT DOCUMENTS

| | | | |
|---|---|---|---|
| 2008/0308775 A1* | 12/2008 | Yabuki | D01F 6/62 |
| | | | 252/587 |
| 2014/0023860 A1* | 1/2014 | Kodaira | C09D 7/45 |
| | | | 252/587 |
| 2022/0081318 A1 | 3/2022 | Tsunematsu et al. | |

FOREIGN PATENT DOCUMENTS

| | | | | |
|---|---|---|---|---|
| CN | 103443224 A | | 12/2013 | |
| CN | 111684012 A | * | 9/2020 | ............... D01F 6/84 |
| EP | 2 439 217 B1 | | 9/2015 | |
| JP | 58-120809 A | | 7/1983 | |
| JP | 2006-132042 A | | 5/2006 | |
| JP | 5493225 B2 | | 5/2014 | |
| JP | 2018-90936 A | | 6/2018 | |
| JP | 2020050690 A | * | 4/2020 | ........... C09D 11/037 |
| TW | 202035294 A | * | 10/2020 | ............... C09C 3/10 |
| WO | 2020/153035 A1 | | 7/2020 | |

OTHER PUBLICATIONS

International Search Report and Written Opinion issued in International Patent Application No. PCT/JP2021/046876, dated Feb. 15, 2022, along with an English translation thereof.
International Preliminary Report on Patentability issued in International Patent Application No. PCT/JP2021/046876, dated Jun. 13, 2023, along with an English translation thereof.
Office Action that issued in corresponding Chinese Patent Application No. 202180085902.8, dated Mar. 21, 2024, along with English translation thereof.
Extended European Search Report that issued in the corresponding European Patent Application. No. 21910657.2, dated Mar. 11, 2025.

* cited by examiner

*Primary Examiner* — Eisa B Elhilo
(74) *Attorney, Agent, or Firm* — GREENBLUM & BERNSTEIN, P.L.C.

(57) ABSTRACT

Dispersion is obtained by: blending a specific resin emulsion for protecting a tungsten-based infrared-absorbing pigment; and dispersing the tungsten-based infrared-absorbing pigment in a state of being coated in advance by means of the resin emulsion.

14 Claims, No Drawings

TUNGSTEN-BASED INFRARED-ABSORBING PIGMENT DISPERSION, DYEING LIQUID, FIBER PRODUCT, AND METHOD FOR TREATING FIBER PRODUCT

FIELD

The present invention relates to a tungsten-based infrared-absorbing pigment dispersion liquid, a dyeing liquid mixed with the dispersion liquid, a textile product treated with the dispersion liquid or the dyeing liquid, and a method for treating a textile product.

BACKGROUND

Hygroscopic heat-generation materials, which generate heat when fibers adsorb moisture, and heat-storage-and-retention materials, which convert sunlight absorbed by fibers into heat, are conventionally known as textile products having a heat-generation property.

Among these materials, materials formed of fibers having an infrared absorbent applied thereto are known as heat-storage-and-retention materials. By applying an infrared absorbent to the fibers, infrared rays from sunlight can be absorbed and the temperature inside the fibers can be increased. In addition, the increased temperature can be maintained for a long period of time, resulting in materials having a high heat-retention property.

Examples of the infrared absorbent used in heat-storage-and-retention materials include carbon materials such as carbon black; metal oxide particles such as cesium tungsten oxide (CWO), antimony-doped tin oxide (ATO), and indium tin oxide (ITO); and infrared-absorbing dyes of organic compounds.

PTL 1, for example, suggests a fiber blended with a carbon-based material (refer to PTL 1). In addition, PTL 2 discloses a composite fiber having a core-sheath structure in which the core component is a polyamide-based resin containing 5 to 25% by mass of an infrared absorbent and the sheath component is a polyester-based resin, wherein microparticles coated with antimony-doped tin oxide (ATO) or indium tin oxide (ITO) as the infrared absorbent are used (refer to PTL 2).

The fiber disclosed in PTL 1 has a high heat-storage-and-retention effect. However, due to the black color of the carbon-based material, when the fiber is used in a fabric, in some cases, colors become dark and outer appearance is affected.

The antimony-doped tin oxide (ATO) or indium tin oxide (ITO) used in the fiber disclosed in PTL 2 needs to be added in a large amount in order to obtain a sufficient heat-storage-and-retention effect. When the fiber is used in a fabric, in some cases, colors become dull and a sharpness in outer appearance cannot be satisfied.

PTL 3 suggests a fiber using cesium tungsten oxide (CWO) as an infrared absorbent (refer to PTL 3).

Since a tungsten-based infrared-absorbing pigment such as cesium tungsten oxide (CWO) is not only a transparent material that transmits visible light, but also exhibits a sufficient effect even at a small amount, the hue of a resulting fabric is not changed.

CITATION LIST

Patent Literature

[PTL 1] Japanese Unexamined Patent Publication (Kokai) No. 58-120809

[PTL 2] Japanese Unexamined Patent Publication (Kokai) No. 2018-90936

[PTL 3] Japanese Unexamined Patent Publication (Kokai) No. 2006-132042

SUMMARY

Technical Problem

For the purpose of applying a tungsten-based infrared-absorbing pigment to a surface of a textile product such as a fiber or a fabric, when the textile product is treated with a treatment liquid containing water as a medium, if a cationizing agent used in a preceding step of dyeing the textile product is present, the tungsten-based infrared-absorbing pigment agglomerates in the treatment liquid. When the treatment is carried out using such a treatment liquid, processing variations occur in the treated item, and obtaining a textile product having the tungsten-based infrared-absorbing pigment uniformly adhered thereto is difficult.

The present invention has been made in view of the above background. An object of the present invention is to provide a tungsten-based infrared-absorbing pigment dispersion liquid in which, even in the presence of a cationizing agent, agglomeration of the tungsten-based infrared-absorbing pigment and processing variations can be suppressed to obtain a textile product having the tungsten-based infrared-absorbing pigment uniformly adhered thereto. Another object of the present invention is to provide a dyeing liquid mixed with the dispersion liquid; a textile product treated with the dispersion liquid or the dyeing liquid and having a heat-storage-and-retention property; and a method for treating a textile product.

Solution to Problem

The present inventors have carried out intensive studies to achieve the above objects. The present inventors have discovered that the above objects can be achieved by mixing in a specific resin emulsion for protecting a tungsten-based infrared-absorbing pigment and forming a dispersion liquid having dispersed therein the tungsten-based infrared-absorbing pigment preliminarily coated with the resin emulsion, and completed the present invention. Specifically, when using the dispersion liquid of the present invention, even in the presence of a cationizing agent, agglomeration of the tungsten-based infrared-absorbing pigment and processing variations are suppressed so that a textile product having the tungsten-based infrared-absorbing pigment uniformly adhered thereto can be obtained. The present invention is as follows.

<<Aspect 1>>

A tungsten-based infrared-absorbing pigment dispersion liquid comprising a tungsten-based infrared-absorbing pigment, a vinyl chloride-based resin emulsion, and water.

<<Aspect 2>>

The tungsten-based infrared-absorbing pigment dispersion liquid according to Aspect 1, wherein the tungsten-based infrared-absorbing pigment is at least one or more selected from composite tungsten oxides represented by a general formula (1): $M_xW_yO_z$, wherein M is one or more elements selected from the group consisting of H, He, alkali metal elements, alkaline earth metal elements, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; x, y, and z are each a positive number; $0<x/y\leq 1$; and $2.2\leq z/y\leq 3.0$, or tungsten oxides having a Magnéli phase represented by a general formula (2): $W_yO_z$, wherein W is tungsten; O is oxygen; y and z are each a positive number; and $2.45\leq z/y\leq 2.999$.

<<Aspect 3>>

The tungsten-based infrared-absorbing pigment dispersion liquid according to Aspect 1 or 2, wherein the vinyl chloride-based resin emulsion is a copolymer of vinyl chloride and an acrylic acid ester.

<<Aspect 4>>

The tungsten-based infrared-absorbing pigment dispersion liquid according to Aspect 3, wherein a composition ratio of the vinyl chloride to the acrylic acid ester in the vinyl chloride-based resin emulsion, as a mass ratio, is 20:80 to 80:20.

<<Aspect 5>>

The tungsten-based infrared-absorbing pigment dispersion liquid according to Aspect 3, wherein a composition ratio of the vinyl chloride to the acrylic acid ester in the vinyl chloride-based resin emulsion, as a mass ratio, is 40:60 to 80:20.

<<Aspect 6>>

The tungsten-based infrared-absorbing pigment dispersion liquid according to any one of Aspects 1 to 5 for treating a textile product.

<<Aspect 7>>

A textile product treated with a treatment liquid comprising the tungsten-based infrared-absorbing pigment dispersion liquid according to any one of Aspects 1 to 6.

<<Aspect 8>>

A dyeing liquid comprising the tungsten-based infrared-absorbing pigment dispersion liquid according to any one of Aspects 1 to 6 and a dye.

<<Aspect 9>>

A textile product dyed with the dyeing liquid according to Aspect 8.

<<Aspect 10>>

A method for treating a textile product, comprising:

a cationization treatment step of treating a textile product using a treatment liquid comprising a cationizing agent; and an adhesion treatment step of treating the textile product using a treatment liquid comprising the tungsten-based infrared-absorbing pigment dispersion liquid according to any one of Aspects 1 to 6 to adhere the tungsten-based infrared-absorbing pigment to the textile product.

Advantageous Effects of Invention

The tungsten-based infrared-absorbing pigment dispersion liquid of the present invention is a dispersion liquid in which agglomeration of a tungsten-based infrared-absorbing pigment is suppressed even when a cationizing agent is present.

By treating a textile product with the tungsten-based infrared-absorbing pigment dispersion liquid of the present invention, processing variations are suppressed, and a textile product having the tungsten-based infrared-absorbing pigment uniformly adhered thereto and having a heat-storage-and-retention function can be obtained.

By using the tungsten-based infrared-absorbing pigment dispersion liquid of the present invention, it is possible to impart a heat-storage-and-retention function even when an item to be treated is a structure which has been already shaped.

By preparing a dyeing liquid comprising the tungsten-based infrared-absorbing pigment dispersion liquid of the present invention and a dye, it is possible to adhere a tungsten-based infrared-absorbing pigment to an item during a dyeing step. Thus, a dyed heat-storage-and-retention material can be produced without increasing the number of steps, which can greatly contribute to productivity.

Textile products obtained by applying the tungsten-based infrared-absorbing pigment dispersion liquid of the present invention have an effect of preventing transmission photography using infrared rays, and thus have a function of preventing covert photography, in addition to a heat-storage-and-retention function.

DESCRIPTION OF EMBODIMENTS

<<Tungsten-Based Infrared-Absorbing Pigment Dispersion Liquid>>

The tungsten-based infrared-absorbing pigment dispersion liquid of the present invention comprises a tungsten-based infrared-absorbing pigment, a vinyl chloride-based resin emulsion, and water.

The tungsten-based infrared-absorbing pigment dispersion liquid of the present invention comprises a tungsten-based infrared-absorbing pigment in a state where agglomeration is suppressed even when a cationizing agent is present. By treating an item with the dispersion liquid, the tungsten-based infrared-absorbing pigment can be uniformly adhered to a surface of the item. As a result, the item can be imparted with an infrared-absorbing performance and in turn a heat-storage-and-retention function.

Without being bound by theory, it is considered that the above effect is obtained because the tungsten-based infrared-absorbing pigment dispersion liquid of the present invention comprises a specific resin for protecting the tungsten-based infrared-absorbing pigment and the tungsten-based infrared-absorbing pigment is dispersed in a state of being preliminarily coated with the resin.

By dispersing the tungsten-based infrared-absorbing pigment dispersion liquid of the present invention in a dyeing liquid used in a general dyeing step, a dyeing liquid which imparts an infrared-absorbing performance to a dyed textile product can be provided.

<Tungsten-Based Infrared-Absorbing Pigment>

The tungsten-based infrared-absorbing pigment used in the tungsten-based infrared-absorbing pigment dispersion liquid of the present invention is not particularly limited. Any pigment known as an infrared absorbent can be used.

The tungsten-based infrared-absorbing pigment may be, for example, one or more infrared-absorbing pigments selected from composite tungsten oxides represented by a general formula (1): $M_xW_yO_z$, wherein M is one or more elements selected from the group consisting of H, He, alkali metal elements, alkaline earth metal elements, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; x, y, and z are each a positive number; $0<x/y\leq 1$; and $2.2\leq z/y\leq 3.0$, or tungsten oxides having a Magnéli phase represented by a general formula (2): $W_yO_z$, wherein W is tungsten; O is oxygen; y and z are each a positive number; and $2.45\leq z/y\leq 2.999$.

Such a tungsten-based infrared-absorbing pigment can be produced by a production method of a composite tungsten oxide or a tungsten oxide having a Magnéli phase disclosed in, for example, Japanese Unexamined Patent Publication (Kokai) No. 2005-187323.

Due to the element M added to the composite tungsten oxide represented by the general formula (1) including when $z/y=3.0$ in the general formula (1), free electrons are generated, the absorption characteristics from the free electrons are exhibited in the near-infrared light wavelength region, and the composite tungsten oxide is effective as a material that absorbs near-infrared radiation near the wavelength of 1000 nm.

Particularly, from the viewpoint of improving optical characteristics and weatherability as a near-infrared-absorbing material, the element M can be one or more selected from the group consisting of Cs, Rb, K, Tl, In, Ba, Li, Ca, Sr, Fe, and Sn.

The composite tungsten oxide represented by the general formula (1) may be treated with a silane coupling agent. By treating with a silane coupling agent, near-infrared absorption and transparency in the visible light wavelength region can be enhanced.

When the value of x/y indicating the addition amount of the element M is greater than 0, sufficient free electrons are generated and a near-infrared absorption effect can be sufficiently demonstrated. The larger the addition amount of the element M, the greater the number of free electrons supplied, and in turn the greater the near-infrared absorption effect. Normally, this effect saturates at the value of x/y of about 1. When the value of x/y is 1 or less, it is possible to prevent the formation of an impurity phase in a pigment-containing layer.

The value of x/y may be 0.001 or greater, 0.2 or greater, or 0.30 or greater, and may be 0.85 or less, 0.5 or less, or 0.35 or less. Particularly, the value of x/y can be 0.33.

The value of z/y in the general formulas (1) and (2) indicates the level of oxygen amount control. For the composite tungsten oxide represented by the general formula (1), when the value of z/y satisfies the relation $2.2 \leq z/y \leq 3.0$, the same oxygen control mechanism operates as the tungsten oxide represented by the general formula (2), and additionally, even when $z/y=3.0$, free electrons are supplied due to the addition of the element M. In the general formula (1), the value of z/y may satisfy the relation $2.45 \leq z/y \leq 3.0$.

The composite tungsten oxide represented by the general formula (1) preferably comprises a hexagonal crystal structure or consists of a hexagonal crystal structure. When the composite tungsten oxide represented by the general formula (1) has a hexagonal crystal structure, transmission in the visible light wavelength region of the pigment is increased, and absorption in the near-infrared light wavelength region is increased. Cations of the added element M are present in the voids of the hexagonal crystal.

Generally, when an element M having a large ionic radius is added, hexagonal crystals are formed. Specifically, hexagonal crystals are easily formed when an element having a large ionic radius such as Cs, K, Rb, Tl, In, Ba, Sn, Li, Ca, Sr, or Fe is added. However, the element M in the composite tungsten oxide represented by the general formula (1) is not limited to these elements as long as the added element M is present in the hexagonal voids formed by $WO_6$ units.

When the composite tungsten oxide having a hexagonal crystal structure and represented by the general formula (1) has a uniform crystal structure, the addition amount of the added element M can be set to 0.2 or greater and 0.5 or less or can be 0.30 or greater and 0.35 or less in terms of the value of x/y, and can be particularly set to 0.33. When the value of x/y is 0.33, it is considered that the added element M is arranged substantially in all of the hexagonal voids.

Other than hexagonal, the crystal structure may be tetragonal or cubic tungsten bronze. Depending on the crystal structure, the absorption sites for the near-infrared light wavelength region of the composite tungsten oxide represented by the general formula (1) tend to change, and the absorption sties tend to migrate to the long wavelength side in the order of cubic, tetragonal, and hexagonal. This is accompanied by low absorption in the visible light wavelength region in the order of hexagonal, tetragonal, and cubic. Thus, in applications where more light transmitted in the visible light wavelength region and more light absorbed in the near-infrared light wavelength region are desired, a hexagonal tungsten bronze may be used.

In the tungsten oxide having a Magnéli phase represented by the general formula (2), a pigment in which the so-called "Magnéli phase", wherein the value of z/y satisfies the relation $2.45 \leq z/y \leq 2.999$, imparts high stability and high absorption characteristics in the near-infrared light wavelength region is obtained.

For the composite tungsten oxide represented by the general formula (1) and the tungsten oxide having a Magnéli phase represented by the general formula (2), the transparent color tone is often bluish to greenish due to significant absorption of light in the near-infrared light wavelength region, particularly near the wavelength of 1000 nm.

The dispersed particle size of the tungsten-based infrared-absorbing pigment used in the tungsten-based infrared-absorbing pigment dispersion liquid of the present invention is not particularly limited and can be appropriately selected according to the intended use thereof.

When a high transparency is desired, a tungsten-based infrared-absorbing pigment having a dispersed particle size of 2000 nm or less by volume average is preferably used. When the dispersed particle size is 2000 nm or less, the difference between the peak of transmittance (reflectance) in the visible light wavelength region and the bottom of absorption in the near-infrared light wavelength region becomes large, and thus a near-infrared-absorbing pigment having transparency in the visible light wavelength region is obtained. Moreover, for particles having a dispersed particle size of less than 2000 nm, light is not completely blocked by scattering, and thus visibility in the visible light wavelength region can be maintained while transparency can be efficiently maintained.

When transparency in the visible light wavelength region is emphasized, scattering by the particles is preferably taken into account. Specifically, the dispersed particle size by volume average of the tungsten-based infrared-absorbing pigment is preferably 200 nm or less, and may be 100 nm or less, 50 nm or less, or 30 nm or less.

When the dispersed particle size of the tungsten-based infrared-absorbing pigment is 200 nm or less, geometric scattering or Mie scattering is reduced, and the dispersed particle size enters the Rayleigh scattering region. In the Rayleigh scattering region, the amount of scattered light decreases in inverse proportion to the sixth power of the dispersed particle size. Thus, as the dispersed particle size decreases, scattering is reduced and transparency is improved. When the dispersed particle size of the tungsten-based infrared-absorbing pigment is 100 nm or less, the amount of scattered light decreases significantly. Thus, from the viewpoint of avoiding light scattering, the dispersed particle size is preferably small.

When the dispersed particle size of the tungsten-based infrared-absorbing pigment is 1 nm or more, 3 nm or more, 5 nm or more, or 10 nm or more, industrial production tends to be easier.

The dispersed particle size by volume average of the tungsten-based infrared-absorbing pigment can be measured using a Microtrac particle size analyzer (manufactured by Nikkiso Co., Ltd.) by a dynamic light scattering method, in which microparticles in Brownian motion are irradiated with laser light to obtain light scattering information, and a particle size is determined therefrom.

The content of the tungsten-based infrared-absorbing pigment in the tungsten-based infrared-absorbing pigment dispersion liquid of the present invention is not particularly limited, and preferably 20 parts by mass or less of the tungsten-based infrared-absorbing pigment is included relative to 100 parts by mass in total solid content of the tungsten-based infrared-absorbing pigment dispersion liquid.

The content of the tungsten-based infrared-absorbing pigment in the tungsten-based infrared-absorbing pigment dispersion liquid of the present invention relative to 100 parts by mass in total solid content of the tungsten-based infrared-absorbing pigment dispersion liquid may be 20 parts by mass or less, 15 parts by mass or less, 14 parts by mass or less, 12 parts by mass or less, 10 parts by mass or less, 8 parts by mass or less, 5 parts by mass or less, or 3 parts by mass or less.

The content of the tungsten-based infrared-absorbing pigment in the tungsten-based infrared-absorbing pigment dispersion liquid of the present invention relative to 100 parts by mass in total solid content of the tungsten-based infrared-absorbing pigment dispersion liquid may be 0.1 parts by mass or more, 0.5 parts by mass or more, 1.0 parts by mass or more, 1.5 parts by mass or more, or 2.0 parts by mass or more.

<Vinyl Chloride-Based Resin Emulsion>

The tungsten-based infrared-absorbing pigment dispersion liquid of the present invention comprises a vinyl chloride-based resin emulsion as an indispensable component. By containing a vinyl chloride-based resin emulsion, a dispersion liquid having dispersed therein the tungsten-based infrared-absorbing pigment in a state of being preliminarily coated with the resin emulsion is obtained.

By coating the tungsten-based infrared-absorbing pigment with the vinyl chloride-based resin emulsion, agglomeration of the tungsten-based infrared-absorbing pigment in the tungsten-based infrared-absorbing pigment dispersion liquid of the present invention is suppressed, even when a cationizing agent is present. Further, in a treatment with the resulting dispersion liquid, processing variations in an item can be suppressed.

The vinyl chloride-based resin constituting the vinyl chloride-based resin emulsion used in the present invention is not particularly limited, and may be a homopolymer of vinyl chloride or a copolymer with an additional polymerized monomer or oligomer.

Of the above, a copolymer of vinyl chloride and an acrylic acid ester can exhibit a binder function while improving dispersibility, and is thus preferable.

The resin emulsion consisting of a copolymer of vinyl chloride and an acrylic acid ester can be a commercially available product, and examples thereof include the VINYBLAN™ 700 series (Nissin Chemical Industry Co., Ltd.).

The VINYBLAN 700 series is a series of vinyl chloride-based resin emulsions consisting of a copolymer of vinyl chloride and an acrylic acid ester, polymerized without using an emulsifier. Examples of a production method thereof include a method of emulsifying and copolymerizing a monomer composition comprising a vinyl chloride monomer or a vinyl chloride monomer and an ethylenically unsaturated group-containing monomer copolymerizable therewith in the presence of a styrene-acrylic acid ester oligomer and/or an acrylic acid ester oligomer. The average particle size thereof is in a range of 10 to 150 nm.

The acrylic acid ester monomer used in the styrene-acrylic acid ester oligomer or the acrylic acid ester oligomer that is emulsified and copolymerized with vinyl chloride is not particularly limited, and examples thereof include methyl (meth)acrylate, ethyl (meth)acrylate, and butyl (meth)acrylate.

The monomer comprising an ethylenically unsaturated group-containing monomer is not particularly limited. Examples thereof, in addition to vinyl acetate, ethylene, propylene, and vinylidene chloride, include ethylenically unsaturated monocarboxylic acid esters such as methyl acrylate, ethyl acrylate, butyl acrylate, 2-ethylhexyl acrylate, and methyl methacrylate; and ethylenically unsaturated monocarboxylic acids such as acrylic acid, methacrylic acid, and crotonic acid.

When using a resin emulsion consisting of a copolymer of vinyl chloride and an acrylic acid ester, the composition ratio of vinyl chloride to acrylic acid ester in the resin emulsion, as a mass ratio, may be 20:80 to 80:20.

The composition ratio of vinyl chloride to acrylic acid ester in the vinyl chloride-based resin emulsion, as a mass ratio, may be 40:60 to 80:20, and is more preferably in a range of 50:50 to 80:20.

When the composition ratio of vinyl chloride to acrylic acid ester in the vinyl chloride-based resin emulsion is in the above range, the dispersibility of the tungsten-based infrared-absorbing pigment in the dispersion liquid and the heat-storage-and-retention property of an item treated with the dispersion liquid can be sufficiently satisfied.

The content of the vinyl chloride-based resin emulsion in the tungsten-based infrared-absorbing pigment dispersion liquid of the present invention is not particularly limited. 20 parts by mass or less of the vinyl chloride-based resin emulsion relative to 100 parts by mass in total solid content of the tungsten-based infrared-absorbing pigment dispersion liquid is preferably contained.

The content of the vinyl chloride-based resin emulsion in the tungsten-based infrared-absorbing pigment dispersion liquid of the present invention relative to 100 parts by mass in total solid content of the tungsten-based infrared-absorbing pigment dispersion liquid may be 20 parts by mass or less, 15 parts by mass or less, 14 parts by mass or less, 12 parts by mass or less, 10 parts by mass or less, 8 parts by mass or less, 5 parts by mass or less, or 3 parts by mass or less.

The content of the vinyl chloride-based resin emulsion in the tungsten-based infrared-absorbing pigment dispersion liquid of the present invention relative to 100 parts by mass in total solid content of the tungsten-based infrared-absorbing pigment dispersion liquid may be 0.1 parts by mass or more, 0.5 parts by mass or more, 1.0 parts by mass or more, 1.5 parts by mass or more, or 2.0 parts by mass or more.

<Water>

The tungsten-based infrared-absorbing pigment dispersion liquid of the present invention comprises water as an indispensable component. Specifically, the tungsten-based infrared-absorbing pigment dispersion liquid of the present invention is an aqueous dispersion liquid using water as a solvent, and solid content is contained in a dispersed state in the water.

For the water as an indispensable component of the tungsten-based infrared-absorbing pigment dispersion liquid of the present invention, for example, water used as a dispersion medium for the tungsten-based infrared-absorbing pigment or the vinyl chloride-based resin emulsion as a raw material may be used as-is, or water may be appropriately added as needed during the production process of the tungsten-based infrared-absorbing pigment dispersion liquid.

<Additional Component>

The tungsten-based infrared-absorbing pigment dispersion liquid of the present invention, in addition to the tungsten-based infrared-absorbing pigment, vinyl chloride-based resin emulsion, and water, may comprise an additionally optional component.

The additional component is not particularly limited, and any known substance can be used. Examples thereof include diluting solvents, dispersants, viscosity modifiers, surface tension modifiers, and pH adjusters.

(Solvent)

The tungsten-based infrared-absorbing pigment dispersion liquid of the present invention may comprise a solvent for the purpose of adjusting dispersion and viscosity. The solvent is not particularly limited as long as the material contained in the dispersion liquid of the present invention is dispersed or dissolved.

The solvent can include various organic solvents, for example, alcohols such as ethanol, propanol, butanol, isopropyl alcohol, isobutyl alcohol, and diacetone alcohol; ethers such as methyl ether, ethyl ether, and propyl ether; esters such as ethyl acetate; ketones such as acetone, methyl ethyl ketone, diethyl ketone, cyclohexanone, ethyl isobutyl ketone, and methyl isobutyl ketone; aromatic hydrocarbons such as toluene, xylene, and benzene; aliphatic hydrocarbons such as normal hexane, heptane, and cyclohexane; and glycol ethers such as propylene glycol monomethyl ether acetate and propylene glycol monoethyl ether.

When using a solvent in the tungsten-based infrared-absorbing pigment dispersion liquid of the present invention, a single solvent or a mixed solvent of two or more may be used. In addition, solvents used for dispersing or diluting each component may be used as-is and mixed in the production process of the tungsten-based infrared-absorbing pigment dispersion liquid. Moreover, a solvent may be added after the composition for obtaining the tungsten-based infrared-absorbing pigment dispersion liquid is prepared, for the purpose of lowering viscosity.

The content of the solvent in the tungsten-based infrared-absorbing pigment dispersion liquid of the present invention is not particularly limited. Examples thereof relative to 100 parts by mass of the tungsten-based infrared-absorbing pigment dispersion liquid may be 0.1 parts by mass or more, 0.5 parts by mass or more, 1 part by mass or more, 3 parts by mass or more, or 5 parts by mass or more, and may be 50 parts by mass or less, 30 parts by mass or less, 20 parts by mass or less, 15 parts by mass or less, 10 parts by mass or less, 5 parts by mass or less, 3 parts by mass or less, or 1 part by mass or less.

(Dispersant)

To enhance the dispersibility of the tungsten-based infrared-absorbing pigment, a dispersant may be contained in the tungsten-based infrared-absorbing pigment dispersion liquid. The dispersant is not particularly limited, and examples thereof can include compounds having functional groups such as amine, hydroxyl group, carboxyl group, and epoxy group. These functional groups have a function of uniformly dispersing the tungsten-based infrared-absorbing pigment by adsorbing to surfaces of the tungsten-based infrared-absorbing pigment and preventing agglomeration of the tungsten-based infrared-absorbing pigment.

<<Production Method of Tungsten-Based Infrared-Absorbing Pigment Dispersion Liquid>>

The production method of the tungsten-based infrared-absorbing pigment dispersion liquid of the present invention is not particularly limited. Any known technique used when forming a dispersion liquid can be used.

Examples thereof include a method of mixing a dispersion comprising a tungsten-based infrared-absorbing pigment and a first solvent with a dispersion comprising a vinyl chloride-based resin emulsion and a second solvent.

A step of mixing in a solvent may be included for the purpose of lowering the viscosity of the tungsten-based infrared-absorbing pigment dispersion liquid.

In this case, the solvent may be mixed with at least one of the pigment dispersion, the vinyl chloride-based resin emulsion dispersion, and a dispersion of additional components before the tungsten-based infrared-absorbing pigment dispersion liquid is obtained, or may be mixed into the tungsten-based infrared-absorbing pigment dispersion liquid after the dispersion liquid is prepared.

<<Application of Tungsten-Based Infrared-Absorbing Pigment Dispersion Liquid>>

The application of the tungsten-based infrared-absorbing pigment dispersion liquid of the present invention is not particularly limited, and can be used for various applications.

The tungsten-based infrared-absorbing pigment dispersion liquid can be used, for example, as a general printing ink, and can be used, for example, as a flexographic printing ink, a letterpress printing ink, an offset printing ink, an intaglio printing ink, a gravure printing ink, a screen printing ink, or an inkjet printing ink.

When the tungsten-based infrared-absorbing pigment dispersion liquid of the present invention is used as a treatment liquid for treating textile products to treat a textile product, processing variations can be suppressed and a textile product having a tungsten-based infrared-absorbing pigment uniformly adhered thereto and having a heat-storage-and-retention function can be obtained, even when a cationizing agent is mixed into the treatment liquid.

Alternatively, the tungsten-based infrared-absorbing pigment dispersion liquid may be mixed with a dye to obtain a dyeing liquid that imparts dyeability and a heat-storage-and-retention property to an item. Since the tungsten-based infrared-absorbing pigment dispersion liquid of the present invention suppresses agglomeration of the tungsten-based infrared-absorbing pigment even when a cationizing agent is present, a dyed textile product having the tungsten-based infrared-absorbing pigment uniformly adhered thereto can be obtained.

When the tungsten-based infrared-absorbing pigment dispersion liquid of the present invention or a dyeing liquid comprising the tungsten-based infrared-absorbing pigment dispersion liquid of the present invention is used, it is possible to impart a uniform heat-storage-and-retention function to a structure which has been already shaped.

<<Dyed Textile Product>>

Another aspect of the present invention is a textile product dyed with a dyeing liquid comprising the tungsten-based infrared-absorbing pigment dispersion liquid of the present invention and a dye. The textile product dyed with the dyeing liquid comprising the tungsten-based infrared-absorbing pigment dispersion liquid of the present invention and a dye forms a dyed heat-storage-and-retention material.

The shape of the textile product is not particularly limited, and may be, for example, a fiber, a fabric, or a structure such as a garment or a bag formed using any of these textile products, and may be a structure partially comprising any of these textile products.

Textile products obtained by applying the tungsten-based infrared-absorbing pigment dispersion liquid of the present invention have an effect of preventing transmission photography using infrared rays, and thus have a function of preventing covert photography, in addition to a heat-storage-and-retention function.

<<Method for Treating Textile Product>>

Another aspect of the present invention is a method for treating a textile product comprising: a cationization treatment step of treating a textile product with a treatment liquid comprising a cationizing agent; and an adhesion treatment step of treating the textile product with a treatment liquid comprising the tungsten-based infrared-absorbing pigment dispersion liquid of the present invention to adhere the tungsten-based infrared-absorbing pigment to the textile product.

According to the method for treating a textile product of the present invention, agglomeration of the tungsten-based infrared-absorbing pigment is suppressed even when a cationizing agent for the preceding cationization treatment step is mixed into a dispersion liquid comprising the tungsten-based infrared-absorbing pigment dispersion liquid. Thus, according to the method for treating a textile product of the present invention, a dyed textile product having a tungsten-based infrared-absorbing pigment uniformly adhered thereto and having a heat-storage-and-retention function can be obtained. The dyed textile product, in addition to the heat-storage-and-retention function, has a function of preventing covert photography.

When a dye is mixed with the treatment liquid comprising the tungsten-based infrared-absorbing pigment dispersion liquid to carry out the adhesion treatment step, the adhesion of the tungsten-based infrared-absorbing pigment to the textile product and the dyeing thereof can be simultaneously carried out.

EXAMPLES

Hereinafter, the present invention will be further described in detail with reference to the Examples and Comparative Examples. However, the present invention is not limited thereto.

<<Material>>

The materials used in the Examples and Comparative Examples are shown below.

(1) Tungsten-Based Infrared-Absorbing Pigment
Cesium tungsten oxide (CWO) dispersion liquid (YMW-D20, Sumitomo Metal Mining Co., Ltd.): CWO content ratio of 20% by mass
Hexagonal $Cs_{0.33}WO_3$: 20% by mass
Water: 64.6% by mass
Dipropylene glycol monomethyl ether: 4.6% by mass
Propane-1,2-diol: 1.5% by mass
Dispersant and others: 9.3% by mass (2) Vinyl Chloride-Based Resin Emulsion
VINYBLAN™ 700 (Nissin Chemical Industry Co., Ltd., vinyl chloride to acrylic acid ester (mass ratio)=30:70, resin solid content: 40% by mass)
VINYBLAN™ 701 (Nissin Chemical Industry Co., Ltd., vinyl chloride to acrylic acid ester (mass ratio)=50:50, resin solid content: 40% by mass)
VINYBLAN™ 715 (Nissin Chemical Industry Co., Ltd., vinyl chloride to acrylic acid ester (mass ratio)=50:50, resin solid content: 40% by mass)

Example 1

<Production of Tungsten-Based Infrared-Absorbing Pigment Dispersion Liquid>

100 g of cesium tungsten oxide (CWO) dispersion liquid (YMW-D20, Sumitomo Metal Mining Co., Ltd.) as the tungsten-based infrared-absorbing pigment and 100 g of VINYBLAN™ 700 (Nissin Chemical Industry Co., Ltd., vinyl chloride to acrylic acid ester (mass ratio)=30:70) as the vinyl chloride-based resin emulsion were mixed to produce a tungsten-based infrared-absorbing pigment dispersion liquid (CWO to vinyl chloride-based resin in dispersion liquid (mass ratio)=1:2).

<Production of Treated Fabric>
(Preparation of Fabric Sample)

A 100% polyester shirt was cut into squares of 9 cm×9 cm as fabric samples for dyeing. The average weight of the fabric samples was 0.9 g.

(Cationization Treatment Step)

0.09 g (10% by mass of fabric sample mass) of a cationizing agent (UNIKA SET XH-57, Union Chemical Industry Co., Ltd.) was added to 300 mL of water. A fabric sample was immersed in the mixture, while stirring, at room temperature for 10 min and then heated to 80° C. for 20 min, followed by natural drying.

(Production of Treatment Liquid)

0.009 g (ratio of CWO mass relative to fabric sample mass:0.1%) of the obtained tungsten-based infrared-absorbing pigment dispersion liquid described above was added to 300 mL of water to produce a treatment liquid.

(Adhesion Treatment Step)

The cationization-treated sample base material was immersed in the produced treatment liquid described above, while stirring, at room temperature for 10 min and heated to 80° C. for 20 min, and a treated fabric having the tungsten-based infrared-absorbing pigment adhered thereto was obtained.

<<Evaluation>>

<Agglomeration of Tungsten-Based Infrared-Absorbing Pigment>

Water, a cationizing agent (UNIKA SET XH-57, Union Chemical Industry Co., Ltd.), and the produced tungsten-based infrared-absorbing pigment dispersion liquid described above were mixed to produce a liquid mixture. The composition at this time was water to cationizing agent to dispersion liquid=100:0.1:0.2 (mass ratio). The produced liquid mixture was visually observed for the presence or absence of agglomeration of tungsten-based infrared-absorbing pigment, and was evaluated by the following evaluation criteria. The results are shown in Table 1.

A: Almost no agglomeration or precipitation could be found.
B: A small amount of agglomeration or precipitation was found.
C: A large amount of agglomeration or precipitation was found.

<Heat-Storage-and-Retention Property>

The treated fabric was placed on a polystyrene foam having high heat insulation. A 250-W incandescent lamp was placed at a position 30 cm away from the treated fabric to emit light thereon for 10 min. The temperatures of the treated fabric before and after irradiation was measured, and the temperature increase was determined. A temperature sensor was placed in contact with the treated fabric at the center portion of the rear side of the surface irradiated with light. A Model PRF250W having a rated voltage of 100V and a color temperature of 3200 K (Iwasaki Electric Co., Ltd.) was used as the incandescent lamp. The results are shown in Table 1.

Examples 2 to 18

Using the vinyl chloride-based resin emulsion indicated in Table 1, the tungsten-based infrared-absorbing pigment dispersion liquid was produced in the same manner as in Example 1, except that the mass ratio (CWO to vinyl chloride-based resin) of CWO to the vinyl chloride-based resin was changed as indicated in Table 1.

Subsequently, a treatment liquid was produced in the same manner as in Example 1, except that the ratio of the CWO mass relative to the fabric sample mass was changed as indicated in Table 1. The resulting treatment liquid was evaluated for agglomeration of the tungsten-based infrared-absorbing pigment in the same manner as in Example 1. The results are shown in Table 1.

Using the produced treatment liquid, the fabric sample was treated in the same manner as in Example 1, and the heat-storage-and-retention property was evaluated. The results are shown in Table 1.

Comparative Examples 1 and 2

The tungsten-based infrared-absorbing pigment dispersion liquid was used as-is, without using a vinyl chloride-based resin emulsion.

A treatment liquid was produced in the same manner as in Example 1 with the ratio of the CWO mass relative to the fabric sample mass indicated in Table 1. The resulting treatment liquid was evaluated for agglomeration of the tungsten-based infrared-absorbing pigment in the same manner as in Example 1. The results are shown in Table 1.

Using the produced treatment liquid, the fabric sample was treated in the same manner as in Example 1, and the heat-storage-and-retention property was evaluated. The results are shown in Table 1.

Comparative Example 3

A tungsten-based infrared-absorbing pigment dispersion liquid was produced in the same manner as in Example 1, except that an aqueous dispersion acrylic resin (VONCOAT™ 40-418EF, DIC Corporation) was used in place of a vinyl chloride-based resin emulsion, as indicated in Table 1, with an attempt to produce a treatment liquid in the same manner as in Example 1. However, there was a large amount of agglomeration of the tungsten-based infrared-absorbing pigment in the treatment liquid, and the adhesion treatment step cannot be carried out.

TABLE 1

| No. | Resin emulsion | | | CWO to resin in pigment dispersion liquid (mass ratio) |
|---|---|---|---|---|
| | Resin type | Product name | Vinyl chloride/acrylic (mass ratio) | |
| Example 1 | vinyl chloride-based | VINYBLAN 700 | 30/70 | 1:2 |
| Example 2 | vinyl chloride-based | VINYBLAN 700 | 30/70 | 1:2 |
| Example 3 | vinyl chloride-based | VINYBLAN 701 | 50/50 | 1:0.4 |
| Example 4 | vinyl chloride-based | VINYBLAN 701 | 50/50 | 1:0.4 |
| Example 5 | vinyl chloride-based | VINYBLAN 701 | 50/50 | 1:1 |
| Example 6 | vinyl chloride-based | VINYBLAN 701 | 50/50 | 1:1 |
| Example 7 | vinyl chloride-based | VINYBLAN 701 | 50/50 | 1:2 |
| Example 8 | vinyl chloride-based | VINYBLAN 701 | 50/50 | 1:2 |
| Example 9 | vinyl chloride-based | VINYBLAN 701 | 50/50 | 1:2 |
| Example 10 | vinyl chloride-based | VINYBLAN 701 | 50/50 | 1:4 |
| Example 11 | vinyl chloride-based | VINYBLAN 701 | 50/50 | 1:4 |
| Example 12 | vinyl chloride-based | VINYBLAN 701 | 50/50 | 1:10 |
| Example 13 | vinyl chloride-based | VINYBLAN 701 | 50/50 | 1:10 |
| Example 14 | vinyl chloride-based | VINYBLAN 701 | 50/50 | 1:20 |
| Example 15 | vinyl chloride-based | VINYBLAN 701 | 50/50 | 1:20 |
| Example 16 | vinyl chloride-based | VINYBLAN 701 | 50/50 | 1:40 |
| Example 17 | vinyl chloride-based | VINYBLAN 701 | 50/50 | 1:40 |
| Example 18 | vinyl chloride-based | VINYBLAN 715 | 50/50 | 1:2 |
| Comparative Example 1 | — | — | — | — |
| Comparative Example 2 | — | — | — | — |
| Comparative Example 3 | acrylic-based | VONCOAT 40-418EF | 0/100 | 1:2 |

| No. | Treatment liquid Ratio of CWO mass to fabric mass (%) | Evaluation of pigment agglomeration | Heat-storage-and-retention property Temperature increase (° C.) |
|---|---|---|---|
| Example 1 | 0.1 | B | 5.3 |
| Example 2 | 1.0 | B | 17.1 |
| Example 3 | 0.1 | B | 1.1 |
| Example 4 | 1.0 | B | 13.2 |
| Example 5 | 0.1 | B | 1.5 |
| Example 6 | 1.0 | B | 14.9 |
| Example 7 | 0.1 | A | 1.6 |

TABLE 1-continued

| | | | |
|---|---|---|---|
| Example 8 | 0.2 | A | 3.1 |
| Example 9 | 1.0 | A | 15.0 |
| Example 10 | 0.1 | A | 1.6 |
| Example 11 | 1.0 | A | 15.2 |
| Example 12 | 0.1 | A | 1.4 |
| Example 13 | 1.0 | A | 14.8 |
| Example 14 | 0.1 | A | 1.5 |
| Example 15 | 1.0 | A | 14.9 |
| Example 16 | 0.1 | A | 1.4 |
| Example 17 | 1.0 | A | 14.7 |
| Example 18 | 0.1 | A | 1.5 |
| Comparative Example 1 | 0.1 | C | 0.6 |
| Comparative Example 2 | 1.0 | C | 0.8 |
| Comparative Example 3 | — | C | — |

The invention claimed is:

1. A tungsten-based infrared-absorbing pigment dispersion liquid comprising a tungsten-based infrared-absorbing pigment, a vinyl chloride-based resin emulsion, and water, wherein
the vinyl chloride-based resin emulsion is a copolymer of vinyl chloride and an acrylic acid ester.

2. The tungsten-based infrared-absorbing pigment dispersion liquid according to claim 1, wherein the tungsten-based infrared-absorbing pigment is at least one or more selected from
composite tungsten oxides represented by a general formula (1): $M_xW_yO_z$, wherein M is one or more elements selected from the group consisting of H, He, alkali metal elements, alkaline earth metal elements, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; x, y, and z are each a positive number; $0<x/y\leq1$; and $2.2\leq z/y\leq3.0$, or
tungsten oxides having a Magnéli phase represented by a general formula (2): $W_yO_z$, wherein W is tungsten; O is oxygen; y and z are each a positive number; and $2.45\leq z/y\leq2.999$.

3. The tungsten-based infrared-absorbing pigment dispersion liquid according to claim 1, wherein a composition ratio of the vinyl chloride to the acrylic acid ester in the vinyl chloride-based resin emulsion, as a mass ratio, is 20:80 to 80:20.

4. The tungsten-based infrared-absorbing pigment dispersion liquid according to claim 1, wherein a composition ratio of the vinyl chloride to the acrylic acid ester in the vinyl chloride-based resin emulsion, as a mass ratio, is 40:60 to 80:20.

5. The tungsten-based infrared-absorbing pigment dispersion liquid according to claim 1 for treating a textile product.

6. A textile product treated with a treatment liquid comprising the tungsten-based infrared-absorbing pigment dispersion liquid according to claim 1.

7. A dyeing liquid comprising the tungsten-based infrared-absorbing pigment dispersion liquid according to claim 1 and a dye.

8. The dyeing liquid according to claim 7, wherein a composition ratio of the vinyl chloride to the acrylic acid ester in the vinyl chloride-based resin emulsion, as a mass ratio, is 20:80 to 80:20.

9. The dyeing liquid according to claim 7, wherein a composition ratio of the vinyl chloride to the acrylic acid ester in the vinyl chloride-based resin emulsion, as a mass ratio, is 40:60 to 80:20.

10. A textile product dyed with the dyeing liquid according to claim 7.

11. A method for treating a textile product, comprising:
cationization treatment by treating a textile product using a treatment liquid comprising a cationizing agent; and
adhesion treatment by treating the textile product using a treatment liquid comprising a tungsten-based infrared-absorbing pigment dispersion liquid to adhere the tungsten-based infrared-absorbing pigment to the textile product, wherein
the tungsten-based infrared-absorbing pigment dispersion liquid comprises a tungsten-based infrared-absorbing pigment, a vinyl chloride-based resin emulsion, and water.

12. The method according to claim 11 wherein the vinyl chloride-based resin emulsion is a copolymer of vinyl chloride and an acrylic acid ester.

13. The method according to claim 12, wherein a composition ratio of the vinyl chloride to the acrylic acid ester in the vinyl chloride-based resin emulsion, as a mass ratio, is 20:80 to 80:20.

14. The method according to claim 12, wherein a composition ratio of the vinyl chloride to the acrylic acid ester in the vinyl chloride-based resin emulsion, as a mass ratio, is 40:60 to 80:20.

* * * * *